(12) United States Patent
Mayega et al.

(10) Patent No.: US 8,004,248 B2
(45) Date of Patent: Aug. 23, 2011

(54) SYSTEMS AND METHODS FOR MULTI-MODE BATTERY CHARGING

(75) Inventors: Valerian Mayega, Irving, TX (US); Percy E. Neyra, Fort Collins, CO (US); Brett E. Smith, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1096 days.

(21) Appl. No.: 11/748,008

(22) Filed: May 14, 2007

(65) Prior Publication Data
US 2007/0278994 A1 Dec. 6, 2007

Related U.S. Application Data

(60) Provisional application No. 60/809,923, filed on May 30, 2006.

(51) Int. Cl.
*H02J 7/04* (2006.01)
(52) U.S. Cl. ......... 320/145; 320/141; 320/143; 320/162
(58) Field of Classification Search ................... 320/145
See application file for complete search history.

(56) References Cited

U.S. PATENT DOCUMENTS

| 5,990,666 A * | 11/1999 | Sekiya et al. ............. 320/162 |
| 6,222,347 B1 * | 4/2001 | Gong ........................ 320/137 |
| 2005/0134220 A1 * | 6/2005 | Brohlin et al. ............ 320/128 |

* cited by examiner

*Primary Examiner* — Edward Tso
*Assistant Examiner* — Johali A Torres Ruiz
(74) *Attorney, Agent, or Firm* — William B. Kempler; Wade J. Brady, III; Frederick J. Telecky, Jr.

(57) ABSTRACT

Various systems and methods for battery charging are disclosed herein. As just one example, a battery charger is disclosed that includes a current feedback loop that has a pulse width modulated current control output, and a voltage feedback loop that has a pulse width modulated voltage control output. In addition, the battery charger includes a transition circuit with a digital phase/frequency detector. The digital phase/frequency detector is operable to detect a duty cycle difference between the pulse width modulated current control output and the pulse width modulated voltage control output. Further, the transition circuit is operable to transition between application of a substantially current charge control to a charging node to application of a substantially constant voltage to the charging node based at least in part on the difference in duty cycle.

17 Claims, 3 Drawing Sheets

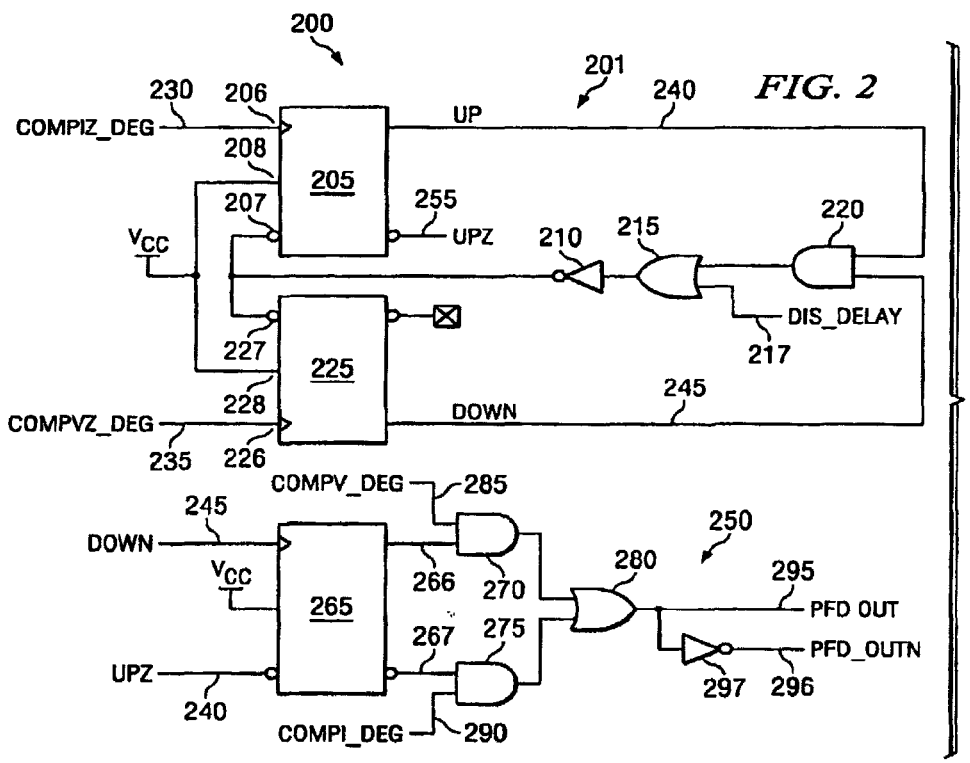
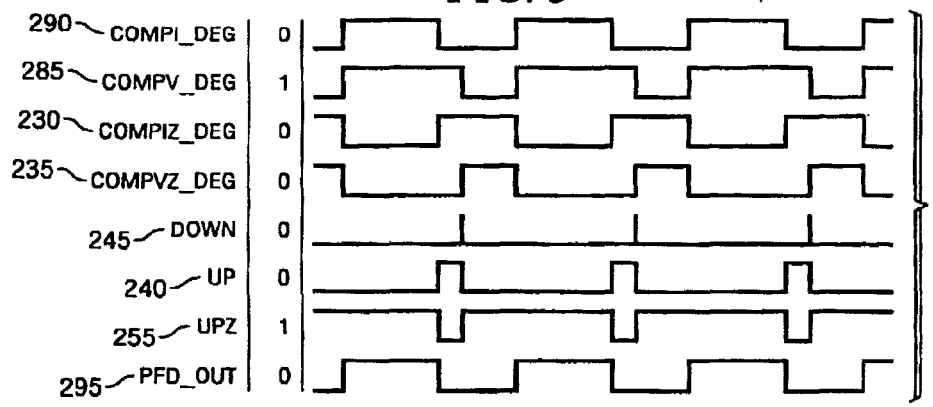

SYSTEMS AND METHODS FOR MULTI-MODE BATTERY CHARGING

CROSS REFERENCE TO RELATED APPLICATION

This application claims priority to (i.e., is a non-provisional filing of) U.S. Provisional Patent Application No. 60/809,923 entitled "Systems and Methods for Multi-Mode Battery Charging", and filed May 30, 2006. The entirety of the aforementioned reference is incorporated herein by reference for all purposes.

BACKGROUND OF THE INVENTION

The present invention is related to systems and methods for charging batteries, and more particularly to systems and methods for switching between current and voltage mode charging.

The need for rechargeable batteries has increased in recent years due to the proliferation of portable electronics devices. A typical consumer electronics device includes a rechargeable battery and an associated battery charger. One complaint about such devices is that recharging the battery requires a significant amount of time. To address this complaint, fast charging approaches have been developed. For example, one common method of fast charging includes a fast charge portion where the battery is charged at a fast rate with a relatively high constant current followed by a slow charge portion where a low current derived from a constant voltage is used to charge the battery. Using this approach, the battery is charged using the high fixed current for a fixed period of time allowing the battery to charge at a relatively constant and fast rate. When the battery voltage nears its final value, the charging switches from a constant current mode to a constant voltage mode. While charging in the constant voltage mode, only a trickle current is applied to the battery. The switch from constant current mode to constant voltage mode is critical. In particular, if the switch occurs too late, the battery may overcharge and/or overheat.

In some cases, use of sensors has been proposed to detect when the battery voltage is approaching its final voltage. When a threshold near the final voltage is detected by the sensor, charging is switched from the constant current mode to the constant voltage mode. After the switch, a timer is initiated and based on predetermined battery profiles, the constant voltage mode charging is switched off after a period of time. However, the aforementioned method of switching between the constant current mode and constant voltage modes is not seamless and relies on predetermined battery characteristics.

Hence, for at least one or more of the aforementioned reasons, advanced systems and methods for battery charging are desired.

BRIEF SUMMARY OF THE INVENTION

The present invention is related to systems and methods for charging batteries, and more particularly to systems and methods for switching between current and voltage mode charging.

Some embodiments of the present invention provide battery charging systems that include a current charge control circuit providing a current charge control output, a voltage charge circuit providing a voltage charge control output, and a transition control circuit. The transition control circuit is operable to seamlessly transition between application of a current charge to a charging node to application of a voltage charge to the charging node based at least in part on the current charge control output and the voltage charge control output. In some cases, the systems further include a battery electrically coupled to the charging node. In one or more cases, at least a portion of the transition control circuit is implemented using digital logic.

In particular instances of the aforementioned embodiments, the current charge control circuit includes an operational amplifier with its inputs electrically coupled across a resistor such that a voltage indicative of the voltage of the battery is applied across the inputs of the first operational amplifier. In addition, the current charge control circuit includes another operational amplifier that receives the output of the first operational amplifier. The output of the second operational amplifier is provided to an input of a comparator. The other input of the comparator is a sawtooth signal. Comparison of the output of the second operational amplifier with the sawtooth signal provides an output pulse width modulated signal where the pulse width is a function of the voltage output of the second operational amplifier.

In various instances of the aforementioned embodiments, the voltage charge control circuit includes a comparator that is electrically coupled to a voltage indicative of the voltage at the charging node. The other input of the comparator is electrically coupled to a sawtooth signal. Comparison of the voltage input and the sawtooth provides an output pulse width modulated signal where the pulse width is a function of the voltage input.

In various instances of the aforementioned embodiments, the current charge control output is a first pulse width modulated signal, and the voltage charge control output is a second pulse width modulated circuit. In such instances, the transition control circuit may include a phase/frequency detector that is used to compare the respective duty cycles of the first pulse width modulated signal and the second pulse width modulated signal.

Other embodiments of the present invention provide methods for battery charging that include providing a current charge control circuit with a current charge control output, and providing a voltage charge control circuit with a voltage charge control output. The methods further include providing a transition control circuit that is operable to seamlessly transition between application of a current charge to a charging node to application of a voltage charge to the charging node based at least in part on the current charge control output and the voltage charge control output.

In some instances of the aforementioned embodiments, the current charge control output and the voltage charge control output are both pulse width modulated signals. In such instances, the methods further include comparing the duty cycle of the current charge control output with the duty cycle of the voltage charge control output. In one particular case, the method further includes selecting application of the voltage charge when the duty cycle of the voltage charge control output is less than the duty cycle of the current charge control output; selecting application of the current charge when the duty cycle of the voltage charge control output is greater than the duty cycle of the current charge control output; and switching from application of the current charge to the voltage charge when the duty cycle of the voltage charge control output is approximately equal to the duty cycle of the current charge control output.

Yet other embodiments of the present invention provide battery chargers with a current feedback loop that has a pulse width modulated current control output, and a voltage feedback loop that has a pulse width modulated voltage control output. In addition, the battery chargers include a transition control circuit with a digital phase/frequency detector. The digital phase/frequency detector is operable to detect a duty cycle difference between the pulse width modulated current control output and the pulse width modulated voltage control output. Further, the transition circuit is operable to transition between application of a current charge to a charging node to application of a voltage charge to the charging node based at least in part on the difference in duty cycle. In some cases, the transition is seamless with only a minor change in voltage evident at the charging node. In some instances of the aforementioned embodiments, the transition between application of the current charge and application of the voltage charge occurs when the difference in duty cycle is approximately zero.

In some instances of the aforementioned embodiments, the current feedback loop includes a comparator with one input electrically coupled to a sawtooth signal and the other input electrically coupled to a voltage indicative of a voltage at the charging node. Similarly, the voltage feedback loop includes a comparator with one input electrically coupled to a sawtooth signal and the other electrically coupled to a voltage indicative of a voltage at the charging node.

This summary provides only a general outline of some embodiments of the present invention. Many other objects, features, advantages and other embodiments of the present invention will become more fully apparent from the following detailed description, the appended claims and the accompanying drawings.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having he same first reference label irrespectively of the second reference label.

FIG. 2 shows a digital portion of a transition circuit in accordance with one or more embodiments of the present invention; and FIGS. 3-5 are timing diagrams illustrating operation of the transition circuit of FIG. 2.

DETAILED DESCRIPTION OF THE INVENTION

Figure 1:
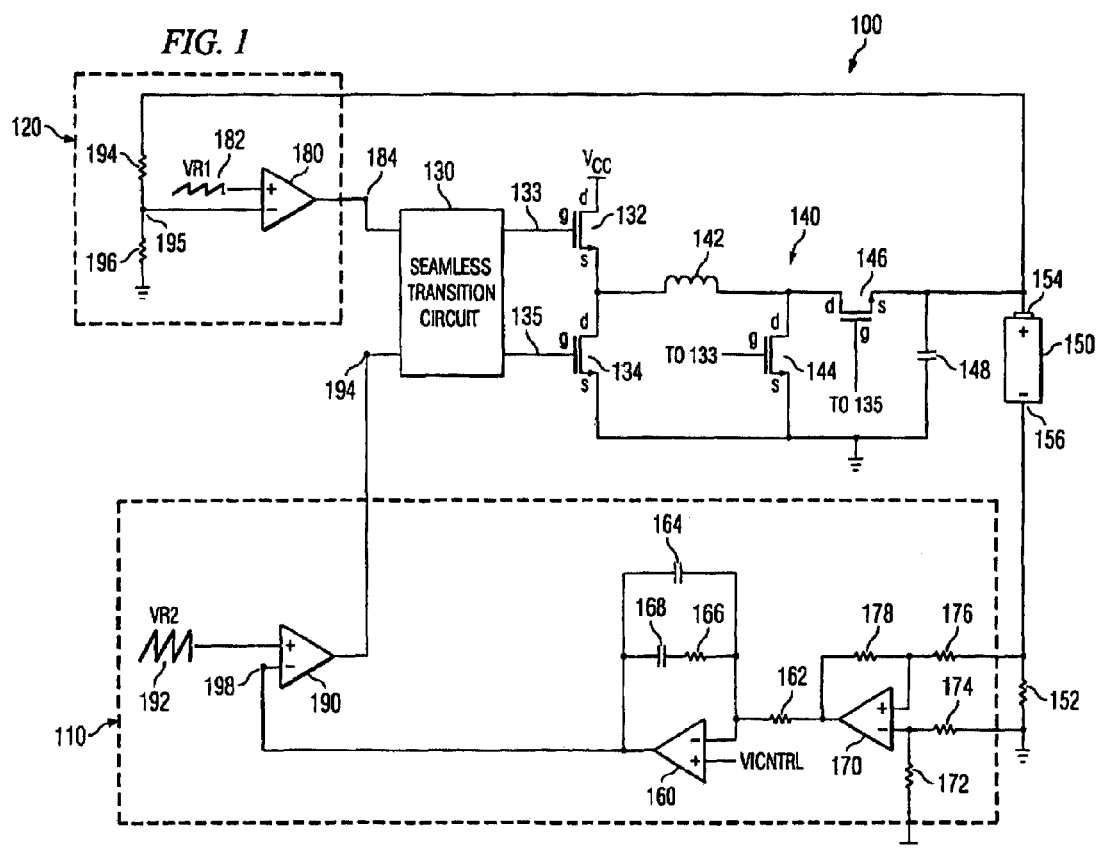
FIG. 1 depicts a battery charger in accordance with some embodiments of the present invention.

The present invention is related to temperature measurement, and more particularly to temperature measurements using a transistor or diode as a sensor.

Various embodiments of the present invention provide battery charging systems that include a current charge control circuit providing a current charge control output, a voltage charge circuit providing a voltage charge control output, and a transition control circuit. As used herein, the phrases "current charging" or "current charge" are used in the broadest sense to mean a charging mode where a relatively high current is applied to charge a battery. In some cases, the relatively high current is also substantially constant over a given charging period. Also, as used herein, the phrases "voltage charge" or "voltage charging" are used in the broadest sense to mean a charging mode where a relatively low current is applied to charge a battery. In some cases, the relatively low current is a function of a substantially constant voltage available for charging. Also, as used herein, the phrase "electrically coupled" is used in its broadest sense to mean any coupling whereby an electrical signal can pass from one device to another. As such, electrical coupling may be direct coupling via, for example, a wire; or indirect coupling via, for example, another device. Further, as used herein, the phrase "duty cycle" is used in its broadest sense to mean the relative period of a high assertion verses low assertion of a periodic signal. For purposes of this document, when two duty cycles are compared, it is the minimum period of high assertion that is being compared. Thus, for example, where a first duty cycle with a high assertion period of sixty percent and a low assertion period of forty percent is compared with a second duty cycle with a high assertion period of seventy percent and a low assertion period of thirty percent, the first duty cycle is less than or lower that the second duty cycle because sixty is less than seventy.

The transition control circuit is operable to seamlessly transition between application of a current charge to a charging node to application of a voltage charge to the charging node based at least in part on the current charge control output and the voltage charge control output. In some cases, the systems further include a battery electrically coupled to the charging node. In some cases, at least a portion of the transition control circuit is implemented using digital logic.

Various embodiments of the present invention provide battery charging systems and methods that seamlessly transition between charging modes. For example, in one particular case, a seamless transition between a current charge control mode and a constant voltage mode is provided. In some cases, a current-voltage characteristic is offered where the current charge control mode begins to slowly decay exponentially as the battery reaches its final voltage. In such cases, the offered seamless transition operates much like a wired-or (or wired-AND) of two diodes where the analog information of the current charge control loop is in one wire and the analog information of the other loop is in the other wire. Further, various embodiments of the present invention provide battery charging systems and methods that switch between charging modes without relying on predetermined battery characteristics.

Turning to FIG. 1, a battery charging system 100 in accordance with one or more embodiments of the present invention is depicted. Battery charging system 100 includes two charging loops each providing pulse width modulated feedback signals. The first loop is a current feedback loop 110 shown within a dashed area, and the second loop is a voltage feedback loop 120 shown within another dashed area. Voltage feedback loop 120 includes a voltage divider with two resistors 194, 196. One end of resistor 194 is electrically coupled to a positive terminal 154 or charging node of a battery 150 that is being charged. The other end of resistor 194 is electrically coupled to one end resistor 196 at a voltage feedback node 195, and the other end of resistor 196 is electrically coupled to ground. Voltage feedback loop 120 further includes a comparator 180. One input of comparator 180 is electrically coupled to voltage feedback node 195, and the other input of comparator 180 is electrically coupled to a sawtooth signal 182. Comparator 180 provides a pulse width modulated voltage control output 184.

In some embodiments of the present invention, such as that shown in FIG. 1, voltage feedback loop 120 does not include an integrator, hence the open loop gain of voltage feedback loop 120 is not high leading to only loose control of load regulation. In some embodiments of the present invention, such loose regulation is remedied by adding an integrator in voltage feedback loop 120. In some cases, this increased control may be desirable to tightly control an end charge on battery 150.

Current feedback loop 110 includes a sense amplifier 170 with a feedback and input network consisting of resistors 172, 174, 176, 178. The inputs of sense amplifier 170 are electrically coupled to opposite ends of a resistor 152. Resistor 152 is electrically coupled to a negative terminal 156 of battery 150, and converts a current traversing battery 150 to a voltage. The voltage across resistor 152 is applied across the inputs of sense amplifier 170. Thus, the output of sense amplifier 170 represents the charge on battery 150. The output of sense amplifier 170 is provided to a control amplifier 160 which also includes a VICONTRL (i.e., a current command control) input that may be used to adjust the gain of current feedback loop to cancel any offset to the value provided at a current feedback node 198. The following equation describes the operation of integrator/compensator amplifier 160:

$$V_E = (V_{ICNTRL} - V_{FB})\left(\frac{1 + sR1C1}{sR2C1}\right) + V_{ICNTRL},$$

where VFB is the voltage provided from sense amplifier 170, VE is the voltage at current feedback node 198, R1 is resistor 166, C1 is capacitor 168, R2 is resistor 162, and C2 is capacitor 164. Current feedback node 198 is electrically coupled to one input of a comparator 190, and the other input of comparator 190 is electrically coupled to a sawtooth signal 192. The output of comparator 190 is a pulse width modulated current control output 197.

Current feedback loop 110 is operable to control current into battery 150 by accurately regulating a voltage across resistor 150 in series with battery 150. Current feedback loop 110 thus enables a constant current or averaged current control of the charging of battery 150 that provides for a fast charging capability at a relatively high current. In addition, both current feedback loop 110 and voltage feedback loop 120 may be programmable such that one or more charging algorithms executed under, for example, software control can be implemented. In operation, voltage feedback loop 120 operates as a compliance check on current feedback loop 110, and current feedback loop 110 operates as a compliance check on voltage feedback loop 120. In particular, current compliance for voltage feedback loop 120 is set by current feedback loop 110, and voltage compliance for the current feedback loop 110 is set by voltage feedback loop 120. Such compliance may provide, for example, that where 0.5 A of current is commanded, battery charger system 100 may not deliver more than the aforementioned commanded current in any operating condition. Alternatively, where a 4.2V end of charge voltage is programmed, battery charger system 100 will not exceed that voltage.

Battery charging system 100 further includes a seamless transition circuit 130 that is operable to provide a seamless transition from current mode charging to voltage mode charging. In this particular embodiment of the present invention, seamless transition circuit 130 receives pulse width modulated voltage control output 184 and pulse width modulated current control output 197, and employs digital circuitry to control the transition based on the received inputs. Seamless transition circuit 130 includes a non-inverted control output 133 and an inverted control output 135. One exemplary seamless transition circuit in accordance with one or more embodiments of the present invention is more fully discussed below in relation to FIGS. 2-5.

In addition, battery charging system 100 includes a switching regulator circuit 140 that is modified based upon outputs of seamless transition circuit 130. In particular, switching regulator circuit 140 includes a transistor 132 with a gate, a drain and a source (designated as g, d and s, respectively), a transistor 134 with a gate, a drain and a source (designated as g, d and s, respectively), a transistor 144 with a gate, a drain and a source (designated as g, d and s, respectively), and a transistor 146 with a gate, a drain and a source (designated as g, d and s, respectively). The gates of transistors 132, 144 are electrically coupled to the non-inverted control output 133 from seamless transition circuit 130, and the gates of transistors 134, 146 are electrically coupled to inverted control output 135 from seamless transition circuit 130. The drain of transistor 132 is electrically coupled to VCC, and the source of transistor 132 is electrically coupled to the drain of transistor 134 and a node of an inductor 142. The source of transistor 134 is electrically coupled to ground. The drain of transistor 144 is electrically coupled to the other node of inductor 142 and to the drain of transistor 146, and the source of transistor 144 is electrically coupled to ground. The source of transistor 146 is electrically coupled to a node of a capacitor 148, and to charging node 154. The other node of capacitor 148 is electrically coupled to ground.

In operation, when non-inverted control output 133 is asserted high, inverted control output 135 is asserted low. As such, transistors 132, 144 are turned on and transistors 134, 146 are turned off. During the aforementioned condition, energy is building in inductor 142. After a period, non-inverted control output 133 is asserted low while at the same time inverted control output 135 is asserted high. In this condition, transistors 132, 144 are turned off and transistors 134, 146 are turned on. During the aforementioned condition, the energy in inductor 142 is transferred through transistor 146 to charging node 154. After another period, non-inverted control output 133 again asserts high causing energy to be stored anew in inductor 142. Capacitor 148 operates to filter the current provided to charging node 154.

In some embodiments of the present invention, battery charger system 100 is implemented on a semiconductor device with only inductor 142, capacitor 148 and resistor 152 being implemented outside the semiconductor device. Thus, embodiments of the present invention may provide a catalog power management approach where a semiconductor device may be integrated with a larger semiconductor device destined for inclusion in a digital still camera, MP3 Player, portable projector or other product relying on a rechargeable battery. This may be done without increasing the circuit board area needed to implement the product, or only slightly to account for the external inductor, capacitor and resistor. In some cases, battery charger system 100 may be implemented as part of a digital signal processor that is capable of providing algorithmic control of battery charger system 100. Alternatively, battery charger system may be implemented as part of a semiconductor device that is paired with a digital signal processor capable of providing algorithmic control. Based on the disclosure provided herein, one of ordinary skill in the art will recognize a myriad of uses for battery charger systems in accordance with one or more embodiments of the present invention.

Turning to FIG. 2, an exemplary seamless transition circuit 200 in accordance with one or more embodiments of the present invention is depicted. Seamless transition circuit 200 includes a phase/frequency detector circuit 201 and a charge switching circuit 250. Phase/frequency detector circuit 201 receives two input signals: COMPIZ_DEG 230 and COMPVZ_DEG 235. Charge switching circuit 200 provides two outputs: PFD_OUT 295 and PFD_OUTN 296. PFD_OLITN 296 is an inverted version of PFD_OUT 295 provided via an inverter 297.

COMPIZ_DEG 230 is electrically coupled to a clock input 206 of a flip-flop 205, and COMPVZ_DEG is electrically coupled to a clock input 226 of a flip-flop 225. Data inputs 208, 228 of flip-flops 205, 225 are each electrically coupled to VCC, and reset inputs 207, 227 of flip-flops 205, 225 are each electrically coupled to the output of an inverter 210. Inverter 210 receives the output of an OR gate 215, which receives the output of an AND gate 220. AND gate 220 receives an UP output 240 from flip-flop 205, and a DOWN output 245 from flip-flop 225. In addition, OR gate 215 receives a delay signal 217 that may be used to delay or otherwise limit operation of phase/frequency detector circuit 201 by maintaining flip-flops 205, 225 in a constant reset state.

Charge switching circuit 250 includes a flip-flop 265 where DOWN output 245 is electrically coupled to the clock input, an UPZ signal 255 from flip-flop 205 is electrically coupled to the reset input, and the data input is electrically coupled to VCC. A non-inverted output 266 from flip-flop 265 is provided to an input of an AND gate 270, and the other input of AND gate 270 is electrically coupled to a COMPV_DEG 285 signal. An inverted output 267 of flip-flop 275 is provided to an input of an AND gate 275, and the other input of AND gate 275 is electrically coupled to a COMPI_DEG 290 signal. The outputs of AND gates 270, 275 are electrically coupled to the inputs of an OR gate 280. The output of OR gate 280 is PFD_OUT 295. Thus, PFD_OUT 295 is the equivalent of a logical AND of the two switching signals COMPI_DEG and COMPV_DEG.

In one particular implementation of the present invention, exemplary seamless transition circuit 200 is used in place of seamless transition circuit 130 of FIG. 1. In such an implementation, COMPIZ_DEG 230 is electrically coupled to pulse width modulated current control output 197 via an inverter, COMPVZ_DEG 235 is electrically coupled to pulse width modulated voltage control output 184 via an inverter, PFD_OUT 295 is electrically coupled to non-inverted control output 133 and PFD_OUTN 296 is electrically coupled to inverted control output 135.

When implemented as part of battery charging system 100, the pulse width modulated control output 184, 197 with the lowest duty cycle controls the operation of PFD_OUT 295. When battery charging system 100 is operating in a current mode charging, the duty cycle of the COMPI_DEG 290 is lower than the duty cycle of the COMPV_DEG 285 and thus controls the operation of PFD_OUT 295. As the voltage of battery 150 increases, the duty cycles for the COMPI_DEG 290 and COMPV_DEG 285 begin to approach one another. Said another way, the duty cycle of COMPI_DEG 290 increases and the duty cycle for COMPV_DEG 285 decreases. When the aforementioned duty cycles are approximately equal, control over the operation of PFD_OUT 295 passes from COMPI_DEG 290 to COMPV_DEG 285. As such, operation of battery charging system 100 transitions seamlessly from a current charging mode controlled by current feedback loop 110 to a voltage charging mode controlled by voltage feedback loop 120.

Figure 4:
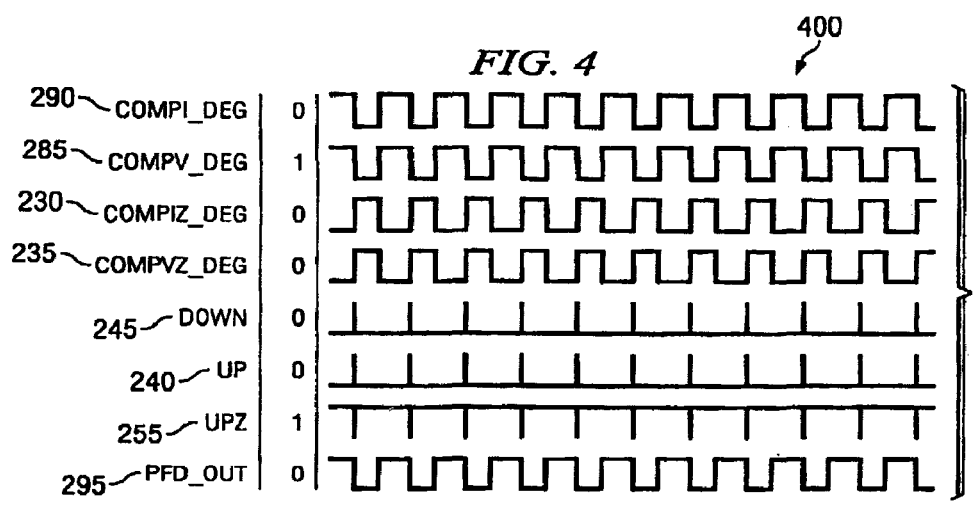
Figure 5:
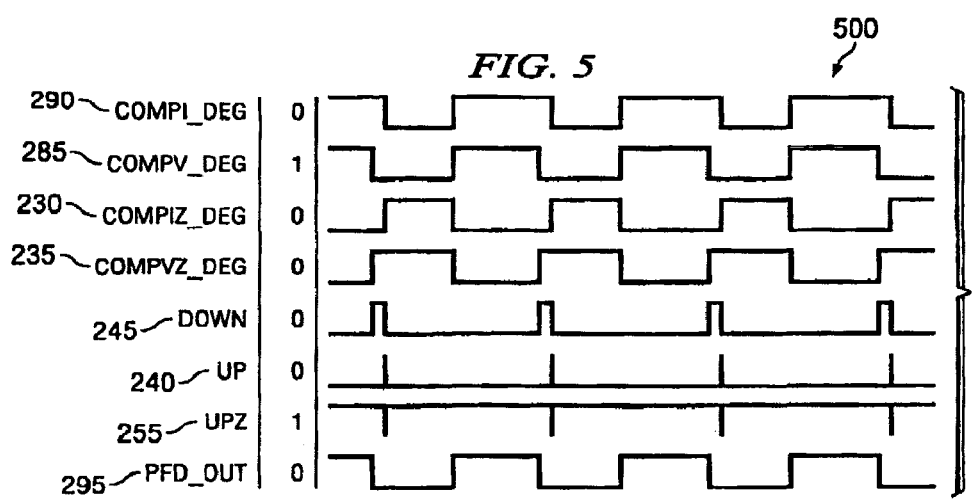

Turning to FIGS. 3-5, operation of exemplary seamless transition circuit 200 is depicted in various timing diagrams. In particular, FIG. 3 includes a timing diagram 300 representing operation of exemplary seamless transition circuit 200 where current charging mode is ongoing. In this case, the duty cycle of COMPI_DEG 290 is lower than the duty cycle of COMPV_DEG 285. In such a case, PFD_OUT 295 is substantially equivalent to COMPI_DEG 290.

In contrast, FIG. 4 includes a timing diagram 400 representing operation of exemplary seamless transition circuit 200 where a transition from current charging mode to voltage charging mode is ongoing. In this case, the duty cycle of COMPI_DEG 290 is substantially equivalent to the duty cycle of COMPV_DEG 285. In such a case, PFD_OUT 295 is substantially equivalent to both COMPV_DEG 285 and COMPI_DEG 290. At this point where the duty cycles of COMPV_DEG 285 and COMPI_DEG 290 are approaching one another, the charge output to charging node 154 by switching regulator circuit 140 would be substantially the same regardless of whether current feedback loop 110 (i.e., COMPI_DEG 285) or voltage feedback loop 120 (i.e., COMPV_DEG 290) was providing the control. Thus, the transition between current charging mode and voltage charging mode is seamless.

FIG. 5 includes a timing diagram 500 representing operation of exemplary seamless transition circuit 200 where voltage charging mode is ongoing. In this case, the duty cycle of COMPV_DEG 285 is lower than the duty cycle of COMPI_DEG 290. In such a case, PFD_OUT 295 is substantially equivalent to COMPV_DEG 290.

When voltage feedback loop 120 is controlling the circuit as governed by seamless transition circuit 130, a relatively small current is provided to battery 150 being charged. This represents the relatively slow charging process generally referred to herein as voltage charging mode. In this mode, battery 150 is charged at a low rate until final voltage is achieved. While the amount of charging occurring in this mode may be less pr time charged than other charging modes, it is nonetheless important as it has an impact on the operating time of battery 150. Further, some types of batteries if not fully charged may become less efficient than what would be expected if a full charge was available.

In contrast to other methods for switching between current charging mode and voltage charging mode, various embodiments of the present invention provide a current that progressively decreases along some IV curve until the point that the battery is fully charged. In some cases, such embodiments may avoid an incomplete charging condition that often occurs with other approaches involving a switch between current charging mode and voltage charging mode.

In one particular embodiment of the present invention, resistor 152 is a twenty millionhm sense resistor. Using such a small resistor value makes accurate detection of the voltage across resistor 152 a premium. In some cases, a digital to analog converter with a high number of bits (i.e., a refined step size) is used to drive VICNTRL. This provides a sufficiently fine control for calibrating current feedback loop 110.

In addition, sense amplifier 170 may contribute to phase loss in current feedback loop 110. In some cases, compensation is provided for such phase loss. Such compensation may include, for example, designing sense amplifier 170 to have an open loop unity gain bandwidth of fifty MegaHertz. This ensures that the voltage across resistor 152 (and the current of battery 150), which has a ripple at the switching frequency, is tracked. In one particular case, a gain of 62.5 is applied to the sense voltage sampled across resistor 152, and the amplified sense voltage is added to a common mode voltage of 1.25V. Such exemplary values allow for both positive and negative corrections.

In some cases, the stability of the transition between current charging mode and voltage charging mode depends upon the load current being delivered. In such cases, both voltage feedback loop 120 and current feedback loop 110 may incorporate integrators with integrated compensation to stabilize the respective loops. The set of equations below describe an open loop operation of an exemplary pulse width modulated converter operating in a Buck-Boost mode:

$$G_{vd}(s) = \frac{G_{do}\left(1 - \frac{s}{\omega z}\right)}{1 + \frac{s}{Q\omega o} + \left(\frac{s}{\omega o}\right)^2}$$

$$G_{do} = \frac{Vo}{1-D} \quad \omega z = \frac{(1-D)^2 R}{DL} \quad \omega o = \frac{(1-D)}{\sqrt{LC}}$$

$$\frac{Vo}{Vin} = \frac{D}{1-D} \quad Q = \frac{(1-D)^2 R}{DL}$$

where Vo is the output voltage, Vin is the input supply, D is the duty cycle applied at the gates of transistors 132, 144, L is the inductance of inductor 142, C is the capacitance of capacitor 148, and R is the equivalent resistance to achieve a desired output current for a given Vo.

The invention has now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A battery charger comprising:
   a current feedback loop, wherein the current feedback loop provides a pulse width modulated current control output;
   a voltage feedback loop, wherein the voltage feedback loop provides a pulse width modulated voltage control output;
   a transition control circuit, wherein the transition control circuit includes a digital phase/frequency detector operable to detect a duty cycle difference between the pulse width modulated current control output and the pulse width modulated voltage control output, and wherein the transition control circuit is operable to transition between application of a current charge to a charging node to application of a voltage charge to the charging node based at least in part on the difference in duty cycle.

2. The battery charger of claim 1, wherein the current feedback loop includes a comparator, and wherein an input of the comparator is a sawtooth signal and another input of the comparator is a voltage indicative of a voltage at the charging node.

3. The battery charger of claim 1, wherein the voltage feedback loop includes a comparator, and wherein an input of the comparator is a sawtooth signal and another input of the comparator is a voltage indicative of a voltage at the charging node.

4. The battery charger of claim 1, wherein a transition between application of the current charge to the charging node to application of the voltage charge to the charging node occurs when the difference in duty cycle is approximately zero.

5. The battery charger of claim 4, wherein the transition causes only a 2 minor change in the voltage at the charging node.

6. A method for battery charging, the method comprising:
   providing a current charge control circuit, wherein the current charge control circuit is operable to provide a current charge control output;
   providing a voltage charge control circuit, wherein the voltage charge control circuit is operable to provide a voltage charge control output and wherein the current charge control output and the voltage charge control output are both pulse width modulated signals;
   providing a transition control circuit, wherein the transition control circuit is operable to seamlessly transition between application of a current charge to a charging node to application of a voltage charge to the charging node based at least in part on the current charge control output and the voltage charge control output ; and
   comparing the duty cycle of the current charge control output with the duty cycle of the voltage charge control output, wherein a duty cycle difference is determined.

7. The method of claim 6, wherein the method further comprises:
   selecting application of the voltage charge when the duty cycle of the voltage charge control output is less than the duty cycle of the current charge control output.

8. The method of claim 6, wherein the method further comprises:
   selecting application of the current charge when the duty cycle of the voltage charge control output is greater than the duty cycle of the current charge control output.

9. The method of claim 6, wherein the method further comprises:
   switching from application of the current charge to the voltage charge when the duty cycle of the voltage charge control output is approximately equal to the duty cycle of the current charge control output.

10. A system for battery charging, the system comprising:
    a current charge control circuit, wherein the current charge control circuit is operable to provide a current charge control output;
    a voltage charge control circuit, wherein the voltage charge circuit is operable to provide a voltage charge control output, wherein the current charge control output is a first pulse width modulated signal, and the voltage charge control output is a second pulse width modulated signal; and
    a transition control circuit, wherein the transition control circuit is operable to seamlessly transition between application of a current charge to a charging node to application of a voltage charge to the charging node based at least in part on the current charge control output and the voltage charge control output and wherein the transition control circuit includes:
    a phase/frequency detector circuit, wherein the phase/frequency detector is operable to detect a frequency difference between the first pulse width modulated signal and the second pulse width modulated signal.

11. The system of claim 10, wherein the system further comprises:
    a battery, wherein the battery is electrically coupled to the charging node.

12. The system of claim 11, wherein the current charge circuit includes:
    a first operational amplifier, wherein a voltage indicative of the voltage of the battery is applied across the inputs of the first operational amplifier; and a second operational amplifier, wherein an input of the second operational amplifier is an output of the first operational amplifier.

13. The system of claim 12, wherein the current charge control circuit further includes:

a comparator, wherein one input of the comparator is electrically coupled to the output of the second operation amplifier, wherein another input of the comparator is electrically coupled to an oscillating input, and wherein the output of the comparator is electrically coupled to the transition circuit.

14. The system of claim 13, wherein the oscillating input is a sawtooth signal.

15. The system of claim 11, wherein the voltage charge circuit includes:

a comparator, wherein one input of the comparator is electrically coupled to a voltage indicative of the charging node, wherein another input of the comparator is electrically coupled to an oscillating input, and wherein output of the comparator is electrically coupled to the transition circuit.

16. The system of claim 15, wherein the oscillating input is a sawtooth signal.

17. The system of claim 10, wherein at least a portion of the transition control circuit is implemented using digital logic.

* * * * *